United States Patent

[11] 3,633,728

| | | |
|---|---|---|
| [72] | Inventor | Donald W. Chamberlin<br>Los Gatos, Calif. |
| [21] | Appl. No. | 15,527 |
| [22] | Filed | Mar. 2, 1970 |
| [45] | Patented | Jan. 11, 1972 |
| [73] | Assignee | FMC Corporation<br>San Jose, Calif. |

[54] MULTILANE SINGULATOR FOR SORTING PEACH HALVES
4 Claims, 11 Drawing Figs.

[52] U.S. Cl. .................................................. 198/32
[51] Int. Cl. .................................................. B65g 47/26
[50] Field of Search ......................................... 198/29, 30, 32, 34

[56] References Cited
UNITED STATES PATENTS

| | | | |
|---|---|---|---|
| 2,827,997 | 3/1958 | Cozzoli.......................... | 198/30 |
| 1,527,337 | 2/1925 | Wilcox.......................... | 198/32 |
| 2,549,322 | 4/1951 | McKinsey..................... | 198/32 X |
| 2,468,290 | 4/1949 | Carter........................... | 198/30 |

*Primary Examiner*—Richard E. Aegerter
*Assistant Examiner*—H. S. Lane
*Attorneys*—F. W. Anderson and C. E. Tripp

ABSTRACT: Peach halves are fed through a shaker for removing the pits and the pitted halves are delivered as a plurality of lanes to a singulating conveyor. The singulating conveyor belt runs beneath two curved walls, each for half of the lanes. The curved walls are in the form of an element of an ellipse disposed for providing a progressively decreasing retardation of the peach halves as they are slid along the walls by the conveyor belt, thereby causing each peach half to move somewhat faster down the conveyor than the one directly behind it. As a result, the peach halves from all the lanes are eventually singulated and presented to inspection devices which can reject those peach halves which retain pit fragments.

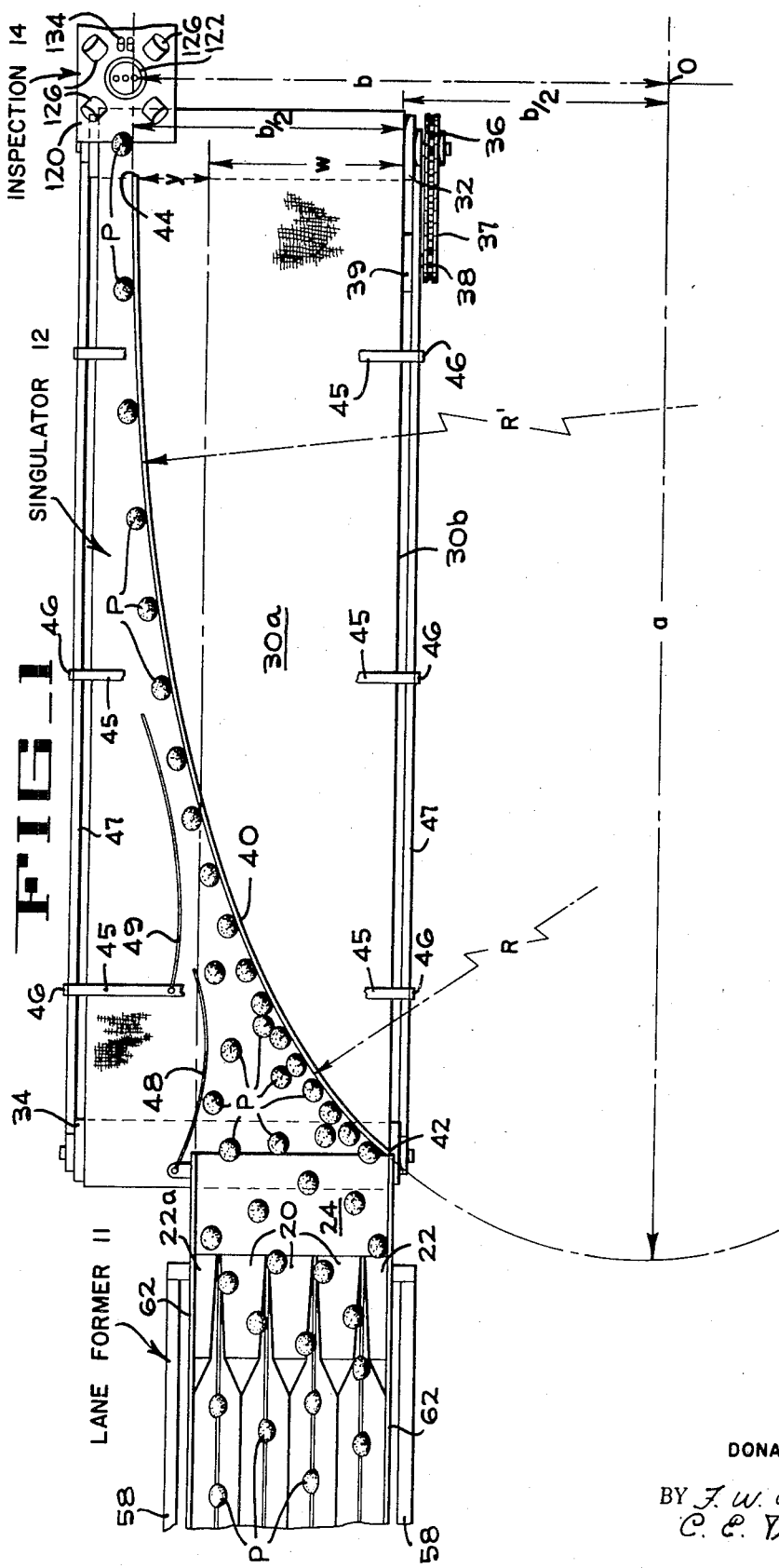

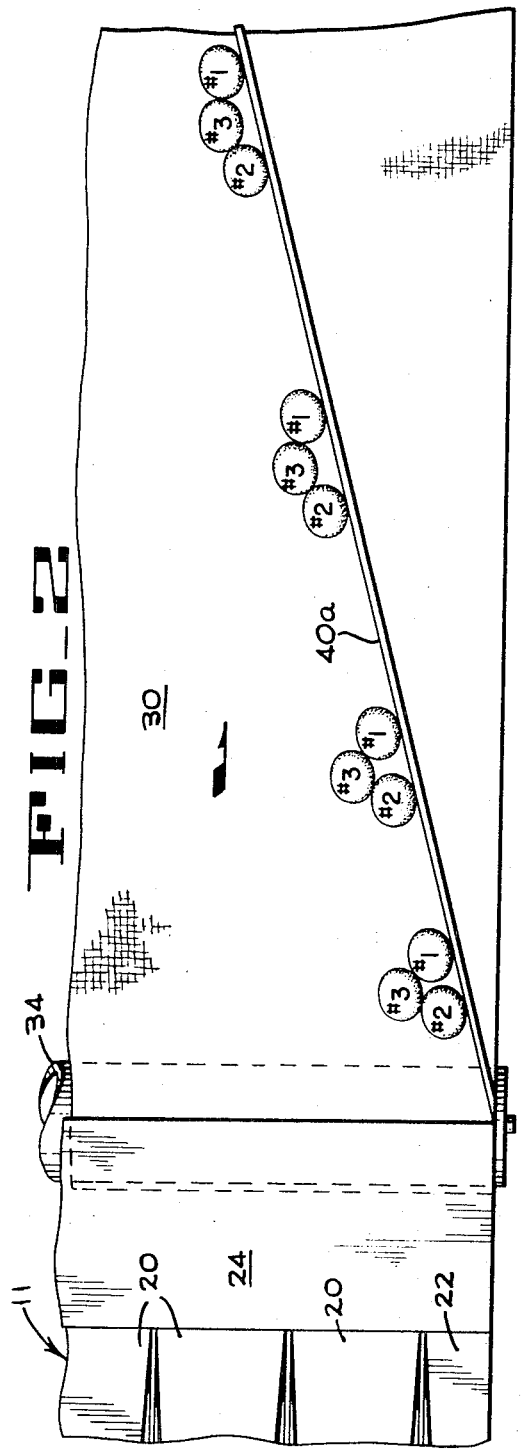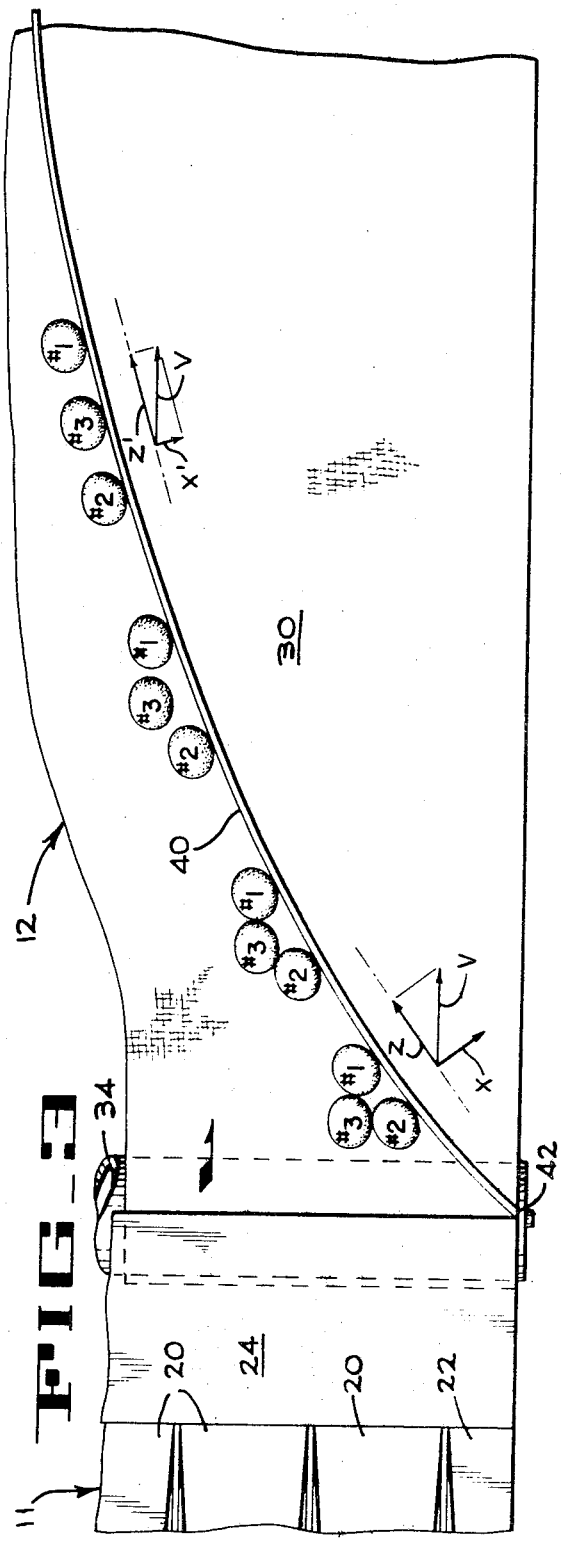

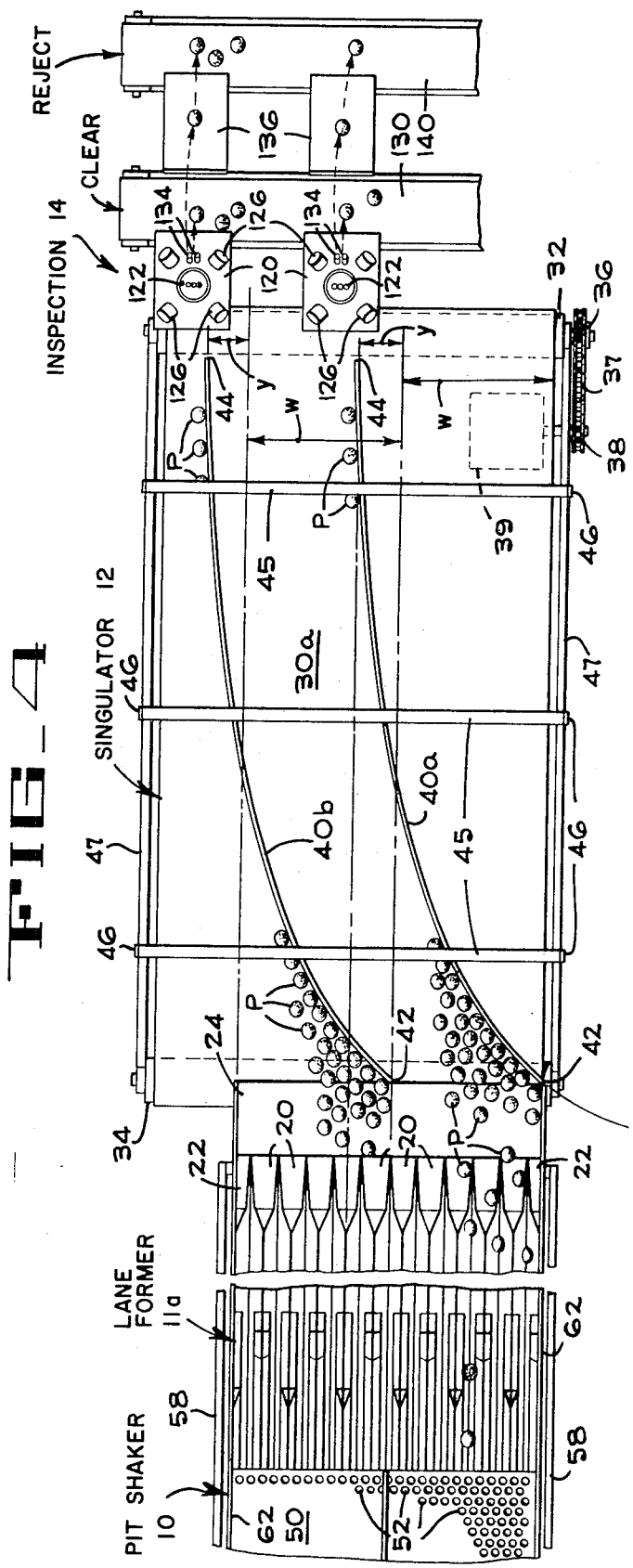

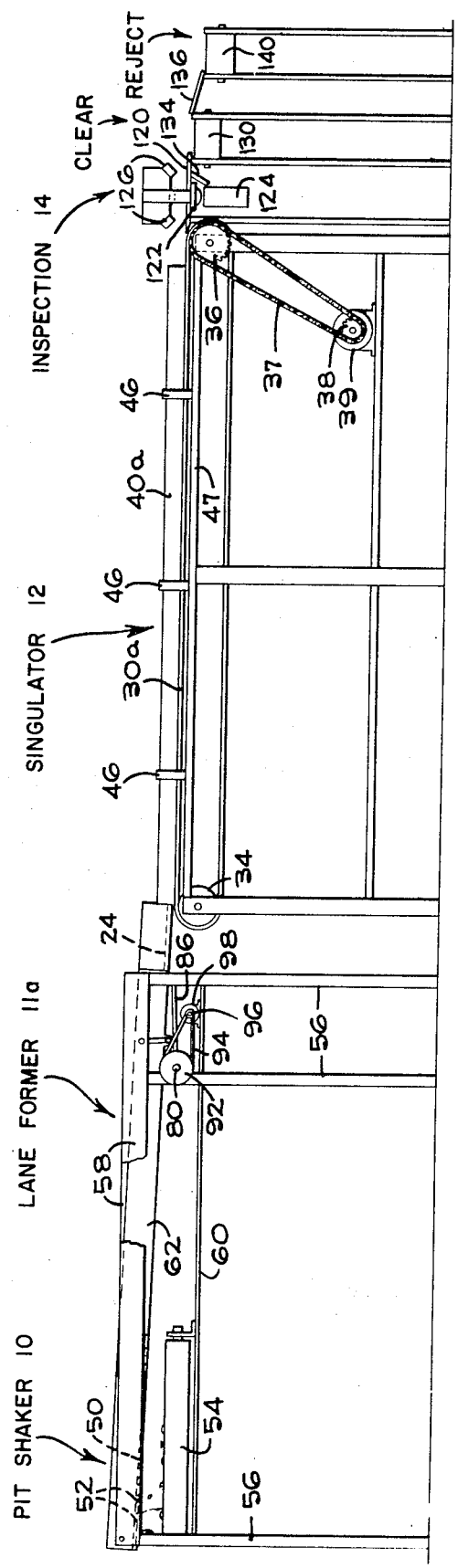

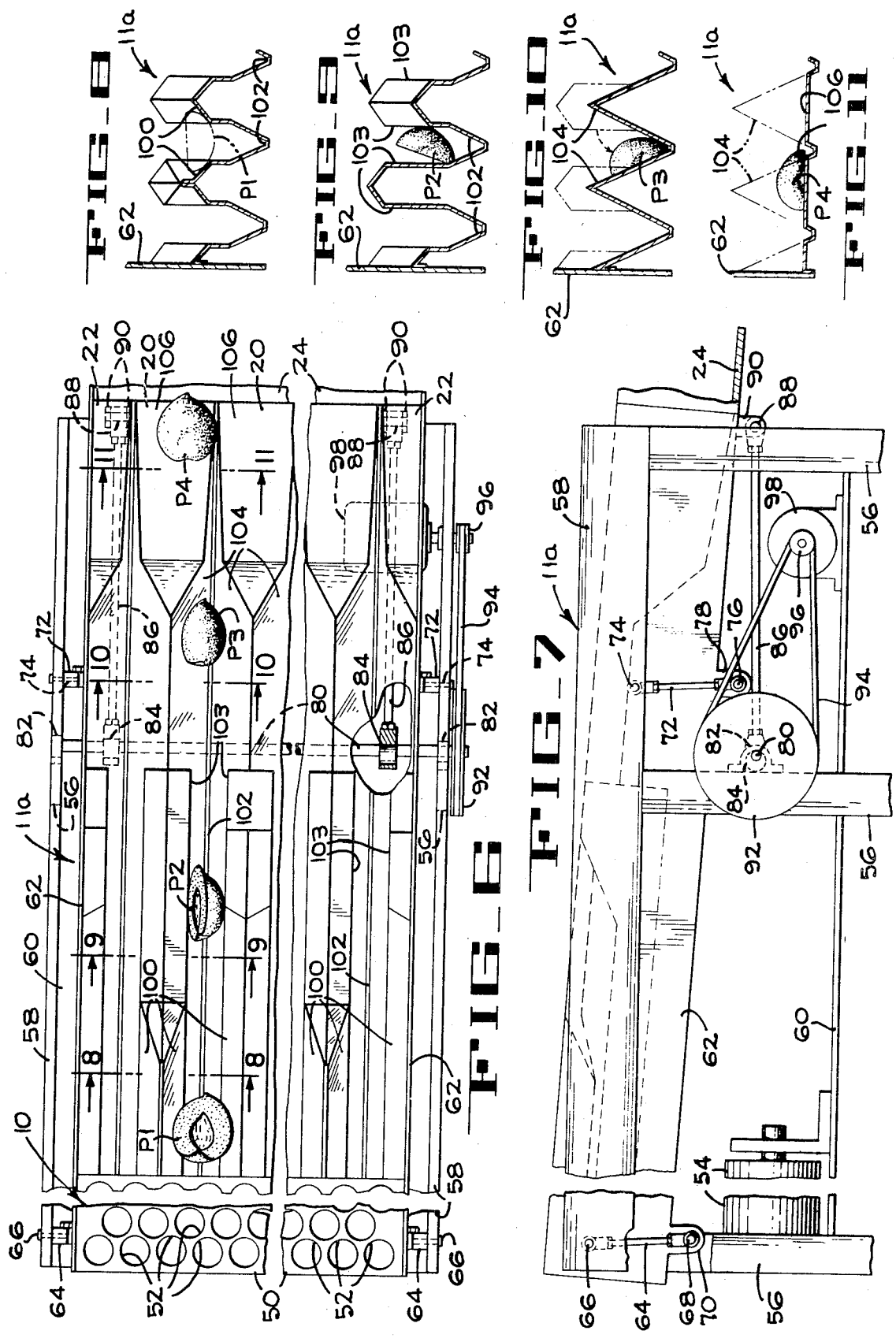

MULTILANE SINGULATOR FOR SORTING PEACH HALVES

This invention relates to the arrangement of articles supplied in bulk at random into single file. The embodiment of the invention to be described is part of an apparatus for pitting peach halves and presenting a plurality of lanes of the pitted peach halves to a singulator for arranging the halves in single file, whereupon each peach half is inspected for the presence of pit fragments and sorted accordingly.

DESCRIPTION OF PRIOR ART

It has been proposed to separate loose pits from pitted peach halves by shaking and presenting the pitted halves with their cut faces down as a plurality of lanes to a singulator conveyor for inspection. Attempts have been made to equip the singulator conveyor with a straight retarder wall which spans a plurality of the delivery lanes and was intended to gradually merge the peach halves into a single file for inspection purposes. It was found that the use of a straight, angled retarder wall running both longitudinally and across the singulating conveyor does not produce effective singulation, because of the uniform retarding action exerted on the peach halves by the retarding wall. As peach halves arrived at the retarding zone and encountered peach halves previously advanced by the conveyor in sliding along the retarding wall, the uniform retarding action, as mentioned above, failed to distribute the peach halves along the retarding wall, the result being that the fruit arrived at the inspecting zone in clumps or as an improperly singulated presentation.

SUMMARY OF THE INVENTION

In accordance with the present invention, a multilane shaking device which serves to clear the peach halves and present them as a plurality of lanes to the singulator conveyor is provided. A retarder wall which runs longitudinally along and laterally of the conveyor belt is provided, but contrary to the prior art this wall is curved so that it has a progressively increasing radius of curvature in the direction of conveyor motion. In the retarder wall construction of the present invention, each peach half, as it is slid along the retarder wall from its respective delivery lane, is retarded less by the wall than the peach half behind it. The result is that the peach halves are progressively separated all along the retarder wall. This provides gaps between peach halves which accommodate newly arriving peach halves from various lanes. The retarder wall is substantially asymptotic to the direction of conveyor belt travel at the delivery end of the wall, that is at the sorting mechanism, thereby providing single files of spaced fruit to the sorter.

In the preferred embodiment of the invention, a number of lanes, such as 10–12 lanes is provided, there are two retarder walls and each retarder wall handles the peaches from half of the lanes. Each retarder wall has a lateral extent which is greater than the lateral extent of the lanes from which it receives peaches by a distance that is greater than the spacing of adjacent lanes. Preferably, this offset or increased spacing of the delivery end of the retarder wall is in the order of 1½ lane spacings. The effect of the offset is to provide singulating action right up to the end of the retarder wall, especially for the last lane.

FIG. 1 is a diagrammatic plan view of a simplified singulating system, embodying a form of the invention wherein a single retarder wall is provided.

FIG. 2 is an enlarged fragmentary diagram of a prior art straight line retarding wall showing how articles tend to form clumps during attempted singulation.

FIG. 3 is a diagram like that of FIG. 2 showing how singulation is achieved by the specially curved retarder wall of the present invention.

FIG. 4 is a plan view of a dual retarder wall peach pit singulating and sorting mechanism embodying the invention.

FIG. 5 is a side view elevation of the mechanism.

FIG. 6 is a fragmentary enlarged plan of a pit shaker and lane former.

FIG. 7 is a side elevation of the device of FIG. 6.

FIGS. 8–11 are fragmentary sections of the lane former, taken as indicated on FIG. 6.

GENERAL DESCRIPTION OF THE INVENTION

The embodiment of the invention to be illustrated and described in detail is an apparatus for shaking pitted sliced peach halves, forming the peach halves into lanes with the cut sides down, singulating the fruit arrived from a number of lanes and inspecting the singulated fruit individually for pit fragments and the like.

As mentioned, before the present invention was made, attempts had been made to singulate peach halves arriving from a plurality of lanes as described above by interposing a straight retarder wall in the path of the arriving peach halves as the halves were carried towards the inspection zone on a belt conveyor. This means of presenting the fruit for inspection was not satisfactory.

Under the present invention a different retarding principle is employed, namely that of progressively decreasing retardation of the fruit in a manner which accommodates progressive longitudinal acceleration of the fruit by the conveyor belt. This causes any clumping of the fruit which might occur upstream of the inspection zone to be removed before it reaches that zone. Each fruit, under the progressively decreasing retarding action of the retarding wall, will be moved longitudinally along the conveyor at a rate that is somewhat faster than the corresponding rate of movement of the fruit immediately behind it. In the present invention, the retarding wall has a progressively increasing radius of a curvature and may be a substantially elliptical element. This progressive increase in the radius of the curvature accommodates the progressive longitudinal acceleration of the fruit by the conveyor belt, just described.

DETAILED DESCRIPTION

GENERAL ASSEMBLY

FIG. 1 is a diagrammatic plan of a peach half singulating system embodying the present invention. A conveyor belt overlies a single retarding wall, the latter having the properties previously referred to. In the embodiment shown, sliced peach halves, after having been pitted and cleared on an apertured shaker 10 (like that of FIG. 4) of known construction are presented to a lane former 11. As will be described presently, the lane former presents the pitted peach halves cut face down for delivery to the improved singulator 12. The singulated and spaced halves are then presented for inspection by an optical apparatus 14. As seen in FIG. 4, a "clear" and a "reject" peach removal system can be provided.

The lane former 11 distributes the peach halves face down in a plurality of wide lanes 20; and half width side lanes 22, 22a to a delivery plate 24, the latter being downwardly inclined (FIG. 5). The peaches lying flat on the delivery plate 24 enter a singulator conveyor belt 30 which has a rubberized canvas friction surface.

RETARDER WALL DESIGN

Above the conveyor belt 30 is a retarder wall 40 which has a progressively increasing radius of curvature, as previously described. The retarder wall 40 runs longitudinally along the conveyor belt but has a substantial lateral extent. The fruit receiving end 42 of the retarder wall originates at the outside edge of the row of lanes, and the entire wall 40 laterally spans a distance "$b/2$" (FIG. 1) which exceeds the total width "$w$" of all the lanes of the lane former 11, by an offset distance "$y$." Thus the upstream end 42 of the retarder wall 40 immediately intercepts peaches from the outside half lane 22 and the wall progressively receives fruit from succeeding lanes. As a result of the offset "$y$," fruit from the side lane 22a also strikes the retarder wall at a zone which still results in a progressively decreasing retarding action. The delivery end 44 of the retarder wall presents singulated and spaced fruit to the inspection device 14.

It has been mentioned that the retarder wall 40, from its receiving end 42 to its delivery end 44 has a progressively increasing radius of curvature and a corresponding decreasing retarding action. The radius of curvature of the wall 40 close to the fruit receiving end 42 is indicated at R (FIG. 1), which radius is less than the radius R' of the wall as it approaches the delivery end 44. In the preferred embodiment of the invention, the retarder wall 40 is an element (or substantially an element) of an ellipse, the geometry of which is also indicated in FIG. 1.

The origin "O" of the ellipse is offset slightly from the end of conveyor 30 in the direction of conveyor motion, and is laterally offset from the side edge 30b of the conveyor by a distance "b/2." The latter distance also equals one-half of the semiminor axis "b" of the ellipse. THese conditions geometrically determine the length of the semimajor axis "a" of the ellipse, which axis is somewhat longer than the longitudinal extent of the retarder wall 40. The delivery end 44 of the retarder wall 40 is substantially asymptotic to the longitudinal path of the conveyor belt 30 at the inspection device 14.

SINGULATING EFFECT

FIG. 2 shows diagrammatically, without attempts at precision, the principals of why a prior art type straight retarder wall 40a positioned above a conveyor belt 30 and in front of a lane former 11 would not satisfactorily singulate the articles presented to it. Since the retarder wall 40a of this design is straight, and at a fixed angle across the conveyor belt, the retarding action of the wall on the fruit at any position along the wall (and the belt) is uniform along the entire upper reach of the belt. In FIG. 2 it will be assumed that a group of fruits Nos. 1, 2 and 3 have been delivered from the lane former and have been carried by the belt 30 to the retarder wall in the order of these numbers. This group is assumed to be first received as shown at the first, or left most diagram of the group on the Figure.

Initially, fruit No. 3 cannot reach the retarder wall, it has encountered previously presented fruits Nos. 1 and 2, and is thus prevented from reaching the wall. Since the retardation on fruit No. 1 is substantially the same as that on fruit No. 2, fruits Nos. 1 and 2 tend to maintain their initial close spacing longitudinally of the conveyor belt. However, in order to show that even under the most favorable circumstances, the action of the singulator of FIG. 2 is not satisfactory, it will be assumed that the spreading action of No. 3 causes some separation between fruits Nos. 1 and 2 as they are swept along the retarder wall by the conveyor belt 30. This action is shown diagrammatically in successive diagrams of the group of three fruits as it moves along the wall. Even under these most favorable conditions, it can be seen that in the conditions shown, there is a good chance that fruit No. 3 will be trapped between the first and second fruits of its group, so that successive fruits will not hug the retarder wall. This failure to align adjacent fruits renders inspection and sorting of the fruits by the inspection device 14 (FIG. 1) difficult, if not impossible.

FIG. 3 illustrates the action of the singulator of the present invention with a retarder wall of progressively increasing radius of curvature. Here, at the lane former 11, it is again assumed that fruits Nos. 1 and 2 have first encountered the retarder wall 40 and that fruit No. 3 has been delivered in a manner to encounter the first two fruits. However, since the radius of curvature of the wall becomes greater in the direction of conveyor motion, the retarding force of the wall upon the fruit progressively decreases. This action is illustrated by the vector diagrams appearing at two points along the retarder wall 40 in FIG. 3. The fruit is presented to the retarder wall by the conveyor belt 30 at a longitudinal velocity indicated at "v." Near the receiving end 42 of the wall, the conveyor velocity "v" has a component "z" in a direction tangent to the point of engagement of the fruit with the retarder wall, and a component "x" normal to the retarder wall. The friction force between the belt 30 and the fruit causes the fruit to slide along the retarder wall and this velocity can also be represented by the tangent component "z." The retarder wall prevents the fruit from moving in the direction of the velocity component "x."

Comparison of the vector diagram near the fruit receiving end 42 with the corresponding vector diagram downstream thereof shows (assuming the same conveyor velocity "v") that at the downstream location that the component "z" prime along the retarder wall (and hence toward its delivery end) is greater than the corresponding upstream vector "z." Thus given two fruits contacting the wall, the downstream fruit moves along faster than that behind it, or stated differently, the upstream fruit is subject to a retarding action that is greater than that experienced by the downstream fruit.

Hence in accordance with the principles of the present invention, fruits are soon singulated along the retarder wall, and usually there is a gap between the adjacent fruits and this gap increases as the fruits progress along the wall. The gap between a given fruit and one immediately trailing it at one position along the wall will be somewhat greater than the gap between adjacent fruits at a correspondingly upstream position. As a result, the fruits are both singulated and spaced when delivered for inspection.

DUAL LANE EMBODIMENT

FIGS. 4 and 5 show a dual inspection lane apparatus for pitting, singulating, and inspecting peach halves in accordance with the present invention and the principles just described. In this construction, the lane former 11a had 10 full lanes 20 and a half lane 22 at each edge. Also, FIG. 4, shows the pit shaker 10 which is an upstream of the lane former. As will be seen presently, the pit shaker 10 and lane former 11a are both longitudinally vibrated. The pit shaker 10 comprises a shaker plate 50 having an array of apertures 52 which are just large enough to pass peach pits. The peach halves are delivered to the shaker plate 50 by means not shown from a pitter. The shaking mechanism, to be described, clears the peach halves of loose pits and pit fragments. When the singulator is used for the inspection of clingstone peaches in accordance with the present invention, this shaking and tumbling action imparted by the pit shaker is adequate to cause the pit halves to fall through the apertures 52 and onto a pit conveyor 54, FIG. 5.

The pit shaker 10 and lane former 11a are supported on a frame by legs 56 (FIGS. 5 and 7) which mount upper frame sidebars 58 (FIGS. 5–7). The design includes a platform 60 mounted below the sidebars 58. The lane former and the pit shaker are substantially unitary and are bounded by sidewalls 62 which also act as fruit retainers.

As best seen in FIGS. 6 and 7, the sidewalls 62 of the pit shaker and lane former, are suspended by linkages which accommodate substantially horizontal oscillation of these devices. The fruit receiving end of the pit shaker is suspended by links 64, the upper ends of which are pinned at 66 to the main frame side rails 58. The lower ends of the links 64 are pinned at 68 to ears 70 depending from the moving side rails 62 of the pit shaker and lane former assembly. Similarly, the lane former is suspended adjacent its delivery end by links 72 suspended from the main frame side rails 58 by pivots 74 and pivoted at their lower ends by pivots 76 projecting from ears 78 on the side rails 62.

The pit shaker and lane forming assembly is longitudinally vibrated while having imparted thereto a partial vertical oscillation by means of an eccentric and link construction. As seen in FIGS. 6 and 7, a shaft 80 is mounted for rotation in bearing blocks 82 projecting from a pair of legs 56. The shaft 80 carries eccentrics 84 (FIG. 6) which rotate within bearings at the ends of paired shaker links 86, (FIGS. 6 and 7). The downstream ends of the links 86 are pivoted at 88 to ears 90 depending from the side rails 62 of the shaking assembly. The eccentric shaft 80 is rotated by a pulley wheel 92 keyed to the shaft and driven by a V-belt 94, a motor pulley 96 and an electric motor 98. Thus when the shaker motor 98 is operating, the eccentric shaft 80 and the eccentrics 84 thereon cause horizontal oscillation of the shaker links 96 which in turn vibrate the pit shaker and lane former assembly in a substantial longitudinal direction due to the suspension provided by the vertical links 64, 72. Some vertical motion is also imparted, augmenting the effectiveness of the action.

LANE FORMER DETAILS

The lane former 11a presents sliced and pitted peaches to the singulator 12 with their cut faces down, so that the empty pit sockets will be available for inspection by the inspection device 14, (FIG. 4). The details of the lane former 11a are not critical to the present invention, and the unit shown in the illustrated embodiment is like that described and claimed in the U.S. Pat. No. 2,832,459, to Lauer Apr. 29, 1958.

FIGS. 6 and 8–11 illustrate the principles of the mode of operation of the lane former. In FIG. 8, an entering peach half P1 is shown upside down in a trough formed by slanting guides 100, below which are narrow channels 22.

Downstream of the peach half P1 a peach half P2 is shown (FIG. 9), which can be considered to be the peach half P1 after it has moved along the lane former. The peach half P2 has partially fallen into the narrow channels 102, preliminary to reorientation. It will be noted that the channels 102 are now below vertical channel walls 103, which assist in guiding the peach into its 90° position of FIG. 9.

In FIG. 10, the peach half P3 (which can be considered to be the peach half P2 advanced further down the lane former) has cleared the vertical channel walls 103 and has flopped against one of opposed pairs of V-walls 104 that are continuations of the walls of troughs 102. Now the peach half is in position to fall with its cut side down.

Referring to FIG. 11, a peach half P4 (which can be considered to be the peach half P3 ready for delivery from the lane former) has flopped from the wall 104 against which it previously rested, onto one of a plurality of horizontal delivery slides 106 for delivery to the slide plate 24 previously mentioned. Thus, it can be seen that regardless of the disposition of the peach halves when they reach the lane former from the pit shaker, they will be delivered to the singulator 12 with the peach cavity down for pickup by the conveyor belt 30.

CONVEYOR

The conveyor belt 30a, which is formed of flexible friction material such as rubberized fabric, has a driving roll 32 (FIG. 4) and an idler roll 34 (FIGS. 4 and 5). The driving roll 32 is driven by a sprocket 36, a chain 37 and a driving sprocket 38, the latter being driven by an electric motor 39.

RETARDER WALLS

As previously mentioned, and as seen in FIG. 4, two retarder walls 40a and 40b are provided, each of which singulates peaches from half of the lanes from lane former 11a. For example, in this embodiment, the lane former 11a has 10 wide lanes 20 and two half lanes 22 and each retarder wall singulates the peaches from 5½ lanes. The two retarder walls 40a, 40b are of the same configuration and construction. They are suspended just above the upper surface of the conveyor belt 30a by transverse straps 45 which straps are supported on side legs 46 (FIG. 5) that project upwardly from longitudinal sidewalls 47 of the singulator unit. The delivery ends 44 of the retarder walls of FIG. 4 are parallel to the conveyor belt path and are geometrically constructed in accordance with the principles shown and described in FIG. 1. The dimension "w" encompasses half of the lanes 20, 22 that is 5½ lanes, and the delivery end 44 is offset from a prolongation of the centerline of the lane former 11a by a distance "y" equal to the width of 1½ lanes, that is, the width of a lane 20 and a half lane 22. Light, flexible leaf springs 48, 49 are mounted to deflect fruit toward the retarder wall.

INSPECTION

The inspection devices 14 and the means for sorting the cleared peaches which are devoid of pit fragments and rejecting those which contain pits or pit fragments are illustrated diagrammatically in FIGS. 4 and 5. It is understood that the details of the inspection device are not critical to the present invention. A device suitable for use herein forms the subject matter of the U.S. pending application to Seaborn, Ser. No. 659,906, filed Aug. 11, 1967 and assigned to the FMC Corporation.

Briefly, each peach inspection device includes a slide plate 120 across which the singulated peaches P move by their own inertia. The peaches pass over an inspection window 122 that is illuminated from below by an illumination system 124, as described in the aforementioned application. The upper sides of the peach halves are illuminated by diffusing lamps 126. If the peach halves are clear of pit fragments they slide on past the slide plate onto a "clear" take-away conveyor 130. If the inspection device finds pit fragments in the peach halves, air jets 134 are activated which impart an elongated trajectory to the rejected peach halves so that the latter clear the conveyor 130 and fall upon a slide plate 136. From the slide plate 136, the rejected peach halves are deposited on a "reject" take-away conveyor 140.

OPERATION

The mode of operation of the singulating system was described in detail as the previous description has progressed and accordingly will now be reviewed only briefly.

Peach halves which have been sawed or otherwise cut in half and pitted and which are normally associated with loose halves of pits are presented to the pit shaker 10, (FIG. 4). This pit shaker has a support plate 50 formed with an array of apertures 52 and is vibrated horizontally with some vertically superimposed oscillations by the vibrator motor 98, associated linkages and eccentrics, all as previously described. The pits fall through the apertures 52 onto the take away conveyor 54 (FIG. 5).

The pitfree peach halves are delivered to the lane former 11a which forms them into 10 full lanes and two half lanes, from which the peach halves are presented with their pit cavities down to the singulator 12 by a slide plate 24. Two retarder walls 40a, 40b are provided above a singulator conveyor belt 30a and each wall receives the peach halves from 5½ lanes. The pit delivery ends of the retarder walls are offset by 1½ lane widths so that the retarder walls present a progressively decreasing but continual retarding action on the peach halves from all associated lanes, right up to their very ends 44. The retarder walls 40a, 40b are constructed in accordance with the geometric principles described in connection with FIG. 1. The result of all of this is that the peach halves are singulated and well spaced before they reach inspection devices 14, all as previously described in detail.

Inspection devices 14 inspect the peach halves for pits or pit fragments and sort them so that the "clear" peach halves are delivered to a take-away conveyor 130 whereas those containing pit fragments are activated by air jets for delivery to the "reject" conveyor 140. Of course, the peach halves having pit fragments can be repitted for final disposal.

In the example of FIG. 4, the total width of the lane former 11a is about 48 inches so that the half width "w" is 24 inches. The offset "y" (which equals 1½ lanes) would be about 6 inches. The center-to-center distance between the rolls 32 and 34 of the singulator conveyor belt 30a will be about 10 feet, and the velocity of the conveyor belt will be about 8½ feet per second. This apparatus will handle about 24 peach halves per minute of the small to medium size range, that is, in the range of about 2.25 to 2.75 inches in diameter.

Although the best mode contemplated for carrying out the present invention has been herein shown and described, it will be apparent that modifications and variations may be made without departing from what is regarded to be the subject matter of the invention represented by the appended claims.

What is claimed is:

1. Apparatus for singulating articles, said apparatus comprising means for forming a plurality of laterally spaced, longitudinal lanes of the articles, an article singulator comprising a conveyor belt forming a longitudinal extension of said lane forming means, said conveyor belt being wider than the aggregate width of said lanes, said conveyor belt having a linear speed greater than the total linear rate of presentation of articles thereto, a curved retarder wall overlying said conveyor belt, said retarder wall running longitudinally along and laterally of said conveyor belt, said curved retarder wall starting from the outer edge of one outside lane and extending laterally beyond the outer edge of the other outside lane thus having a lateral extent greater than the aggregate width of all lanes, said curved retarder wall having a progressively increasing radius of curvature in the direction of conveyor belt motion, said retarder wall accommodating progressive longitudinal acceleration of articles received by said conveyor belt from all of said lanes for singulating the articles as they are carried along the retarder wall by said conveyor belt.

2. The apparatus of claim 1, wherein said curved retarder wall is substantially an element of an ellipse, said ellipse having a minor axis that is perpendicular to the conveyor path and near the delivery end of the curved wall, said substantially elliptical element of the wall encompassing substantially the outer half of the minor ellipse axis.

3. The apparatus of claim 1, wherein the said curved retarder wall extends laterally beyond said other outside lane by more than the width of a single lane.

4. The apparatus of claim 3, wherein said curved retarder wall extends laterally beyond said other outside lane by the width of about 1½ individual lanes.

* * * * *